United States Patent
Sun et al.

(10) Patent No.: US 9,893,814 B2
(45) Date of Patent: *Feb. 13, 2018

(54) UPSTREAM AGGREGATION WITH NOISE PERFORMANCE IMPROVEMENT

(71) Applicant: ARRIS Enterprises LLC, Suwanee, GA (US)

(72) Inventors: Zhijian Sun, Avon, CT (US); Reza A. Saedi, Bryn Mawr, PA (US); Zoran Maricevic, West Hartford, CT (US); Dean Painchaud, Cromwell, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,132

(22) Filed: Feb. 16, 2017

(65) Prior Publication Data

US 2017/0222722 A1    Aug. 3, 2017

Related U.S. Application Data

(63) Continuation of application No. 14/677,675, filed on Apr. 2, 2015, now Pat. No. 9,608,730.

(51) Int. Cl.
*H04J 14/00* (2006.01)
*H04B 10/27* (2013.01)
*H04B 10/2575* (2013.01)

(52) U.S. Cl.
CPC ....... *H04B 10/27* (2013.01); *H04B 10/25751* (2013.01)

(58) Field of Classification Search
CPC .......................... H04B 10/27; H04B 10/25751

(Continued)

(56) References Cited

U.S. PATENT DOCUMENTS 7,222,358 B2    5/2007   Levinson et al.
7,689,128 B2    3/2010   Williams
(Continued)

FOREIGN PATENT DOCUMENTS

EP    2530861 A2    12/2012

OTHER PUBLICATIONS

ARRIS, "Opti Max (TM) 31xx Series Multi Functional Nodes", May 30, 2013, retrieved from the Internet: URL:http://www.bcd.com.ar/admin/files/productos/16_OM3100_PF_22MAY13.pdf, 6 pgs.

*Primary Examiner* — Juan A Torres
(74) *Attorney, Agent, or Firm* — Lori Anne D. Swanson (57) ABSTRACT

Particular embodiments use aggregation logic that reduces the noise in a daisy-chained optical return signal aggregation of multiple nodes. The aggregation logic determines when an input to a transmitter/receiver is not used and disables or turns off that input. Further, in the case of daisy-chaining, a service group aggregation signal (e.g., RF signals) from the customer premise equipment (CPEs) serviced by a respective node are presented to the channel "A" port of a digital return transmitter/receiver. However, internal to the transmitter/receiver, aggregation logic auto-senses what optical return signals have already been aggregated up to that point in the daisy chain and can then intelligently place the service group aggregation signal onto one of the digital return transmitter channels. In one embodiment, if there are two return channels, A and B, whichever of these channels has seen fewer aggregations up to this point, will receive the service group aggregation signal.

12 Claims, 11 Drawing Sheets (58) Field of Classification Search
USPC .......................................................... 398/66
See application file for complete search history.

(56) References Cited

U.S. PATENT DOCUMENTS

| | | |
|---|---|---|
| 8,515,281 B2 | 8/2013 | Maricevic |
| 2012/0213515 A1 | 8/2012 | Maricevic et al. |

UPSTREAM AGGREGATION WITH NOISE PERFORMANCE IMPROVEMENT

CROSS-REFERENCE TO RELATED APPLICATION

This application is a continuation of U.S. patent application Ser. No. 14/677,675 filed on Apr. 2, 2015, entitled, "UPSTREAM AGGREGATION WITH NOISE PERFORMANCE IMPROVEMENT", the contents of both which is incorporated therein.

BACKGROUND OF THE INVENTION

Hybrid fiber-coax (HFC) networks employ a combination of optical fiber and coaxial cable in the network to provide services, such as video, voice, and high-speed Internet, to users over an existing cable television network. A multi-service operator (MSO) uses the HFC network to deliver the above services to users using cable modem termination systems (CMTSs) located at a head-end or hub and customer premise equipment (CPE) devices located at a user's premises.

Typically, the optical fiber network is terminated at an optical node in the HFC network, which then converts the optical signal into an electrical signal. The electrical signal is sent via radio frequency (RF) over the coaxial cable to the user's premises. RF amplifiers following the node are needed to amplify the signal. A typical network topology may be a "node +6" network topology, where "+6" denotes 6 RF amplifiers following the node. Over time, the penetration of optical fiber closer to the users' premises has occurred (known as "fiber deep"). This limits the need for using radio frequency (RF) amplifiers following an optical node. The fiber deep topology reduces the number of RF amplifiers that are needed after the node, and in some cases, reduces the need all the way to zero, which is referred to a "node +0" fiber deep HFC network. In this case, no RF amplifiers are needed if the fiber penetrates deep enough into the HFC network towards the premises.

Using the fiber deep topology, a single node can only reach around 100 premises. This is often too small a size to be designated as a service group. A service group is a group of customer premise equipment devices that are serviced by a cable modem termination system (CMTS) port or converged cable access platform (CCAP) port. The reasoning as to why more than 100 premises are desired relies on economics and statistics that will not be discussed. Due to the desire to have larger service groups than 100, service group aggregation is used to increase the size of a service group.

One way to perform service group aggregation is to "daisy chain" digital optical return signals for multiple nodes to perform upstream aggregation. This aggregates optical return signals for multiple CPEs connected to multiple nodes into a single signal. While this increases the service group number, the aggregated signal also sums the noise floors that are present. The aggregation of the noise floors results in a reduction of the signal-to-noise ratio (SNR) performance.

DETAILED DESCRIPTION

Described herein are techniques for upstream aggregation. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments use aggregation logic that reduces the noise in a daisy-chained optical return signal aggregation of multiple nodes. The aggregation logic may perform multiple functions that improve the signal to noise ratio in the aggregated optical return signal. For example, the aggregation logic determines when an input to a transmitter/receiver is not used and disables or turns off that input. This eliminates the noise addition from an unused port for that input. Further, the aggregation logic performs aggregation of the optical return signals from multiple nodes in a way that minimizes the noise floor addition to the signals. For example, in the case of daisy-chaining, a service group aggregation signal (e.g., RF signals) from the customer premise equipment (CPEs) serviced by a respective node are presented to the channel "A" port of a digital return transmitter/receiver. However, internal to the transmitter/receiver, aggregation logic auto-senses what optical return signals have already been aggregated up to that point in the daisy chain and can then intelligently place the service group aggregation signal onto one of the digital return transmitter channels. In one embodiment, if there are two return channels, A and B, whichever of these channels has seen fewer aggregations up to this point, will receive the service group aggregation signal. This process will be described in more detail below.

Figure 1:
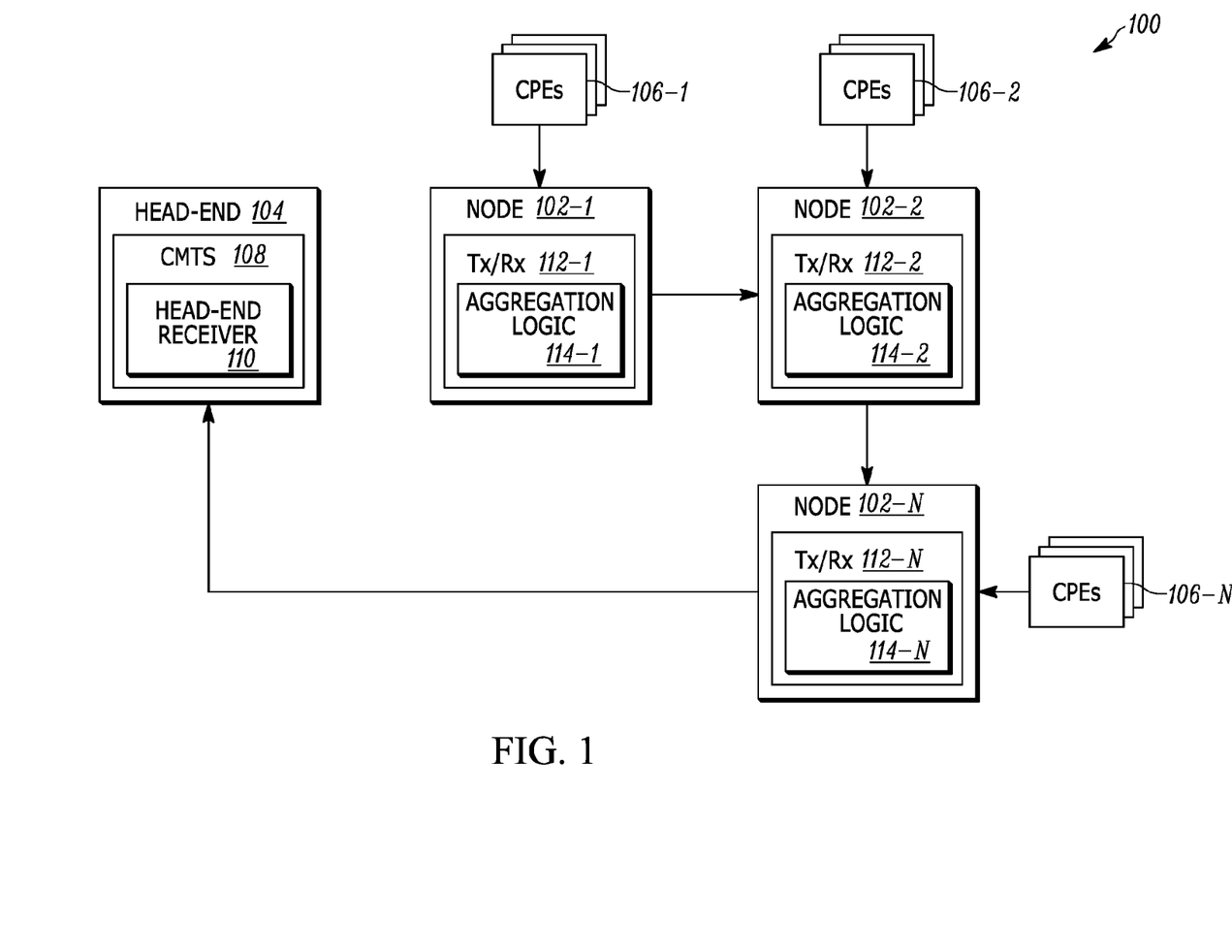
FIG. 1 depicts a simplified system for the aggregation of optical return signals according to one embodiment.

FIG. 1 depicts a simplified system 100 for the aggregation of optical return signals according to one embodiment. System 100 includes a plurality of nodes 102, a head-end 104, and CPEs 106. Nodes 102 may be part of a hybrid fiber-coax (HFC) network. However, although the HFC network is described, other networks may be used. Signals (e.g., data, video, and/or voice signals) are transmitted over the HFC network between head-end 104 and CPEs 106 through nodes 102. Signals transmitted from head-end 104 to CPEs 106 travel in a downstream direction (e.g., forward direction) in one or more downstream channels and signals transmitted from CPEs 106 to head-end 104 travel in an upstream direction (e.g., return direction) on one or more upstream channels.

CPEs 106 may include equipment that is located in a user's premises, such as cable modems or set top boxes or embedded media terminal adapters (EMTAs). CPEs may also include other computing devices. CPEs 106 may receive signals from head-end 104. Also, CPEs 106 send signals to head-end 104, which are aggregated at a node 102. For example, each node 102 may service a group of CPEs 106 where the CPEs 106 send signals (e.g., radio frequency (RF) signals) that are aggregated at the node 102. This aggregated signal is referred to as a service group aggregation signal.

Head-end 104 may be located at or may be a hub of the network. Head-end 104 includes a cable modem termination system (CMTS) 108 that may service a group of CPEs 106. CMTS 108 hosts downstream and upstream ports and may contain receivers 110 that handle communications from CPEs 106. One port of CMTS 108 may form a service group that may service a group of CPEs 106. In this case, a single head-end receiver 110 may service the service group.

Nodes 102 may terminate optical fiber from the HFC network and convert signals between optical and RF. That is, in the downstream direction, node 102 converts signals from the optical domain to the RF domain, and in the upstream direction, node 102 converts signals from the RF domain to the optical domain. Nodes 102 may be daisy-chained, which means that nodes 102-1-102-N may be coupled in series where signals received from a previous node 102 are aggregated with a service group aggregation signal from a current node 102 and transmitted together in a single channel. For example, node 102-1 may receive signals (e.g., RF signals) from CPEs 106-1, and aggregate these signals as a first service group aggregation signal. Node 102-1 sends an optical return signal that includes the first service group aggregation signal to node 102-2. The optical return signal may be an optical signal that includes the service aggregation signal. Although optical return signals are described, nodes 102 may send signals in other domains. Node 102-2 also receives signals (e.g., RF signals) from CPEs 106-2 and aggregates these signals as a second service group aggregation signal. The optical return signal from CPE 106-1 and the second service group aggregation signal from CPE 106-2 are aggregated in node 102-2 and sent to node 102-N in a return signal (e.g., an optical signal). Node 102-N performs a similar aggregation and sends optical return signals to head-end 104. The specific process of how the signals are aggregated will be described in more detail below.

Nodes 102 include a transmitter/receiver 112. The transmitter portion transmits optical signals in the return direction. The receiver portion may receive optical return signals from other nodes 102 and also receives signals from connected CPEs 106. In this case, the receiver may have optical ports to receive optical signals from another node 102 and RF ports to receive RF signals from CPEs 106.

Each transmitter/receiver 112 may include aggregation logic 114 that determines how to aggregate signals that are received at node 102. This includes aggregating signals from coupled CPEs 106 that are sensed by a respective node 102 into a service group aggregation signal and also optical return signals from other nodes 102. This process will now be described in more detail.

Figure 2A:
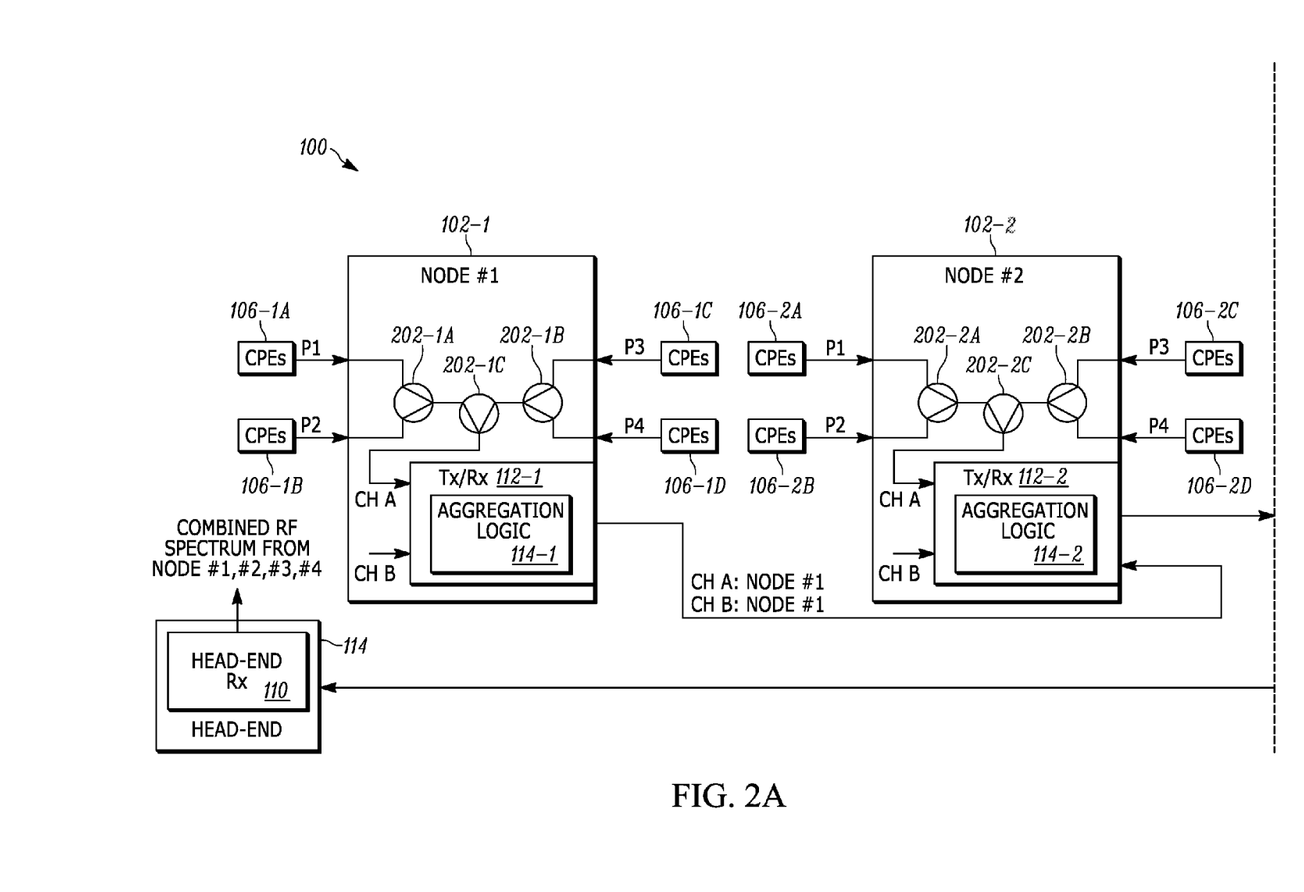
FIGS. 2A and 2B depict an example of the system for aggregating service group aggregation signals and optical return signals according to one embodiment.
Figure 2B:
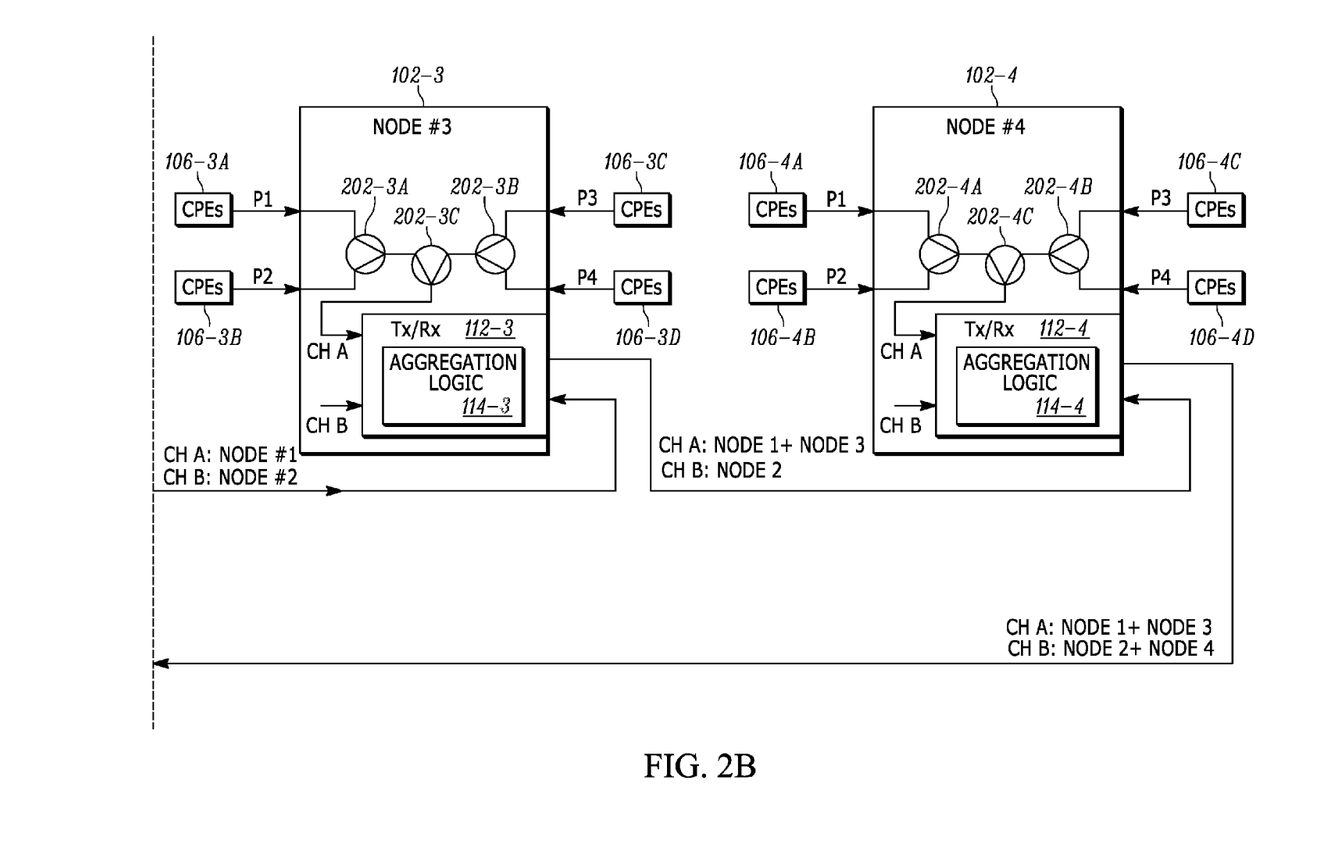

FIGS. 2A and 2B depict an example of system 100 for aggregating service group aggregation signals and optical return signals according to one embodiment. System 100 includes four nodes 102-1-102-4 that will be referred to as node #1, node #2, node #3, and node#4, but it will be recognized that a different amount of nodes may be used. Node #1 is the first node in the daisy chain followed by nodes #2, #3, and #4. The daisy chain may be a sequence or series of nodes. Each node may be coupled to CPEs 106. In one embodiment, the CPEs 106 coupled to a respective node are different from the CPEs 106 coupled to another node.

In this embodiment, nodes may be segmented in that different groups of CPEs 106-1, 106-2, 106-3, and 106-4 are coupled to respective ports P1, P2, P3, and P4 of node 102. The signals for the groups of CPEs may then be combined within node 102. For example, the signals from CPEs 106-1A and 106-1B, which are coupled to ports P1 and P2 of node #1, are combined at a combiner 202-1A, and signals from CPEs 106-1C and 106-1D, which are coupled to ports P3 and P4 of node #1, are combined at a combiner 202-1B. The two signals may be combined together in node #1 at a combiner 202-1C, and input into channel A (CH A) of transmitter/receiver (Tx/Rx) 112-1. Transmitter/receiver 112-1 also includes another channel, channel B (CH B). Although two channels are shown, a different number of channels may also be appreciated, such as 4, 8, etc. In the above architecture, node #1 (and other nodes) are segmented in that the signals from CPEs 106-1A and 106-1B that are coupled to ports P1 and P2 of node #1 and CPEs 106-1C and 106-1D that are coupled to ports P3 and P4 of node #1. Other architectures may be used to aggregate signals from CPEs 106.

In a first function, aggregation logic 114-1 determines whether the input of transmitter/receiver 112-1 does not have a signal present. In this case, aggregation logic 114-1 is looking at the RF inputs for transmitter/receiver 112 in the return direction. When a signal is not present, aggregation logic 114-1 may turn off or disable the input, which eliminates any noise addition from the unused port for the input. In this case, node #1 is not using the channel B input to transmitter/receiver 112-1 because the signals from ports P1-P4 are input through channel A. Aggregation logic 114-1 turns off the port for channel B. In one embodiment, in all nodes, the signals from the ports P1-P4 are always presented to a single port of transmitter/receiver 112. In this case, it is the channel A port. However, as will be described in other details below, it may be to a different port, such as channel B, or there may be an auto-sensing mechanism to determine which port is active.

By disabling the input at channel B, the noise input from channel B is not added to the optical return signal. The RF signals received from customer premise equipment are introduced to analog-to-digital converter (ADC) for each channel. For an unused channel, such as channel B, this channel may introduce analog-to-digital converter (ADC) quantization noise and noise arriving from the input if the input port is not disabled. Previously, if channel B was active, it would add 3 dB to the noise floor of the optical return signal. Aggregation logic 114-1 disables the RF input for channel B when it is not in use and the noise floor from this input is not added to the optical return signal.

In another aspect of the solution, if node 102 is the only node present, that is, the daisy chain is only 1 node long, or node 102 is at the beginning of the daisy chain, then both channel A and channel B are active on the transmitter side of transmitter/receiver 112-1. That is the case for node #1. In this case, the signals from ports P1-P4 are input into channel A and aggregation logic 114-1 has disabled the input for channel B. However, for the output of transmitter/receiver 112-1, aggregation logic 114-1 has placed the optical return signal for node #1 on both channel A and channel B. One reasoning for using both channels is that the return transmitter 112-1 may work the same way if it is in a single-node chain or it is in the first node of a daisy chain. This may simplify the manufacturing process without adding a large amount of noise to the signal in either way. However, it will be recognized that node #1 may send the signal out on only a single channel if needed.

Moving to node #2 in the daisy chain, node #2 receives the optical return signal from node #1 at transmitter/receiver 112-2. In this case, transmitter/receiver 112-2 receives the optical return signal at the optical inputs for channel A and channel B. These optical inputs may be different from the RF inputs. Also, ports P1-P4 are connected to CPEs 106-2A-106-2D, respectively. As before, node #2 is segmented in that the signals from CPEs 106-2A and 106-2B, which are coupled to ports P1 and P2 of node #2, are combined at a combiner 202-2A, and signals from CPEs 106-2C and 106-2D, which are coupled to ports P3 and P4 of node #2, are combined at a combiner 202-2B. The two signals may be combined together in node #2 at a combiner 202-2C, and input into channel A of transmitter/receiver 112-2 as a service group aggregation signal. The channel B input port does not receive any signals from CPEs 106-2. Thus, aggregation logic 114 disables the input at channel B.

In another aspect of the solution, aggregation logic 114-1 may auto-sense what optical return signals have been aggregated already up to this point in the daisy chain on each channel and determine which channel to aggregate the service group aggregation signal for node #2. In one embodiment, aggregation logic 114-1 aggregates the service group aggregation signal on a channel that has the least number of aggregations up to that point. Or, the aggregation is done in an alternating manner on the channels from node to node.

For the second node in the daisy chain, aggregation logic 114-2 receives the optical return signal from node #1 at both optical receiver inputs. Then, aggregation logic 114-2 takes one of the optical return signals (because only one is needed) and determines which output channel to assign the optical return signal to based on the aggregation logic. For example, the aggregation logic may alternate assignment of the optical return signal based on a position of node #2 in the daisy chain. This process will be discussed in more detail with respect to node #3. In this case, aggregation logic 114-2 takes the optical return signal from node #1 and auto-assigns that optical return signal to channel A. The optical return signal for node #2 (that is, the service group aggregation signal from CPEs 106-2) is auto-assigned to channel B. Thus, aggregation logic 114-2 balances the load on channels by assigning the optical return signal for node #1 and the optical return signal for node #2 on different channels. It should be noted that particular embodiments may switch the channels in which the node #1 optical return signal and the node #2 optical return signal are assigned to, but in either case, the signals are assigned to different channels.

In one embodiment, the signals in channels A and B are transported via time-division multiplex independently on each channel. As is shown, channel A includes the node #1 optical return signal and channel B includes the node #2 optical return signal. Each optical return signal may include the RF signals from CPEs 106 that are time division multiplexed into the optical signal.

For node #3, transmitter/receiver 112-3 receives the node #1 optical return signal and the node #2 optical return signal on optical receiver channels A and B, respectively. Also, node #3 receives signals from CPEs 106-3. As for the other nodes, node #3 is segmented and ports P1-P4 are connected to CPEs 106-3A-106-3D, respectively. Node #3 is segmented in that the signals from CPEs 106-3A and 106-3B that are coupled to ports P1 and P2 of node #3 are combined at a combiner 202-3A and CPEs 106-3C and 106-3D that are coupled to ports P3 and P4 of node #3 are combined at a combiner 202-3B. The two signals may be combined together in node #3 at a combiner 202-3C, and input into channel A of transmitter/receiver 112-3. The RF input into channel B is not used and aggregation logic 114-3 disables this input.

Aggregation logic 114-3 then auto-senses what content has been aggregated up to this point in the daisy chain. In this case, channel A includes the node #1 optical return signal and channel B includes the node #2 optical return signal. Aggregation logic 114-3 auto-assigns the optical return signal from node #1 to channel A, the optical return signal from node #2 to channel B, and the optical return signal from node #3 to channel A. The optical return signal for node #3 includes the service group aggregation signal from CPEs 106-3. In this case, channel A now includes the node #1 and node #3 optical return signals and channel B includes the node #2 optical return signal. This continues the alternating of assigning optical return signals from nodes to different channels. Transmitter/receiver 112-3 then outputs the optical return signals to node #4.

For node #4, transmitter/receiver 112-4 receives the node #1 and node #3 optical return signals on a channel A optical input port and the node #2 optical return signal on a channel B optical input port. Also, node #4 receives signals from CPEs 106-4. As for the other nodes, node #4 is segmented and ports P1-P4 are connected to CPEs 106-4A-106-4D, respectively. Node #4 is segmented in that the signals from CPEs 106-4A and 106-4B that are coupled to ports P1 and P2 of node #4 are combined at a combiner 202-4A and CPEs 106-4C and 106-4D that are coupled to ports P3 and P4 of node #4 are combined at a combiner 202-4B. The two signals may be combined together in node #4 at a combiner 202-4C, and input into channel A of transmitter/receiver 112-4. The RF input into channel B is not used and aggregation logic 114 disables this input.

Aggregation logic 114-4 continues the auto-sensing, and alternates the auto-assignment to minimize the noise floor addition. In this case, aggregation logic 114-4 senses that channel A has the node #1 and node #3 optical return signals, but channel B has only the node #2 optical return signal. Thus, aggregation logic 114-4 adds the node #4 optical return signal from the service group aggregation signal to channel B. Transmitter/receiver 112 then outputs the node #1 and node #3 optical return signals on channel A and the node #2 and node #4 optical return signals on channel B.

Since this is the end of the daisy chain, head-end receiver 110 receives the signals on channel A and channel B. Head-end receiver 110 can then de-multiplex each signal for each channel and convert the signals into electrical signals as is known. In one embodiment, receiver 110 outputs a combined RF signal from nodes #1, #2, #3, and #4.

In the above, the TDM streams on channels A and B may be transported over an 11-bit system, which is one more bit than the legacy 10-bit system, and then digitally summed (or not) at the head-end receiver 110. The summed stream is then introduced to a 14-bit digital-to-analog (D2A) conversion where there is effectively no degradation of the signal-to-noise ratio. The legacy systems transported the signals as 10-bit signals and these 10-bits signals were scaled to allow for a full scale analog input to just "fill" the 10-bit words after the A/D converter. So when two 10-bit signals were added at each node to create a new 10-bit signal, each input to this summer needed to be down scaled by 1-bit so that the resulting sum would still "fit" (i.e. not overflow) in a 10-bit signal. This "down scaling" would cause a 6 dB SNR degradation to each 10-bit input signal. With 11-bit transport, nodes sum the two 10-bit signals without "down scaling", and the resulting 11-bit signal does not exhibit this 6 dB degradation. This improvement would be in addition to the 3 dB improvement that is obtained by alternating transport of the RF input signals over the optical channel A and channel B. At head-end 110, with a 14-bit D2A converter, four 11-bit signals can be summed into a 13-bit signal in a similar fashion prior to being input to the D2A, thereby again avoiding the SNR hit from the summation. Other resolutions may be used, such as 10-bit, 12-bit, or 14-bits, but a 14-bit converter is used to cover the case where the input signal has 13-bits of resolution. If head-end receiver summing is not used, head-end receiver 110 has a separate D2A converter for the channel A on the incoming fiber and for the channel B on the incoming fiber. The channel A and channel B on the incoming fiber would not be summed, in which case both D2A converters would be used. In the summed case above, the input to a single D2A (sum of channel A and channel B) would use only one of the D2A converters.

For the four-node-long daisy chain, the noise floors of nodes #1 and #3 do add up on channel A and the noise floors of nodes #2 and #4 do add up on channel B, but the 11-bit versus 10-bit handling reduces this noise floor impact in addition to handling two nodes over two TDM streams A and B. For this four-node-long daisy chain, the auto-assignment to channels A or channel B and the digital summing at head-end receiver 110 provides at least a 3 dB improvement over a non-alternating aggregation. The 3 dB improvement would be achieved because the 4 nodes are only summing 2 of 4 incoming RF ports into the fiber channel A or channel B versus summing 4 incoming RF ports (½ as much noise added, so 3 dB better performance) at the 4 nodes. The 11-bit versus 10-bit transport provided an additional gain in SNR as described above In the above example, only channel A is used for the service group aggregation. That is, the RF input to channel A for transmitter/receiver 112 is used to aggregate the signals from the coupled CPEs 106 in the service group. Channel B is not used to aggregate any RF signals from the coupled CPEs 106. Because of this, aggregation logic 114 can disable channel B and reduce the noise floor introduced by this input.

Figure 3A:
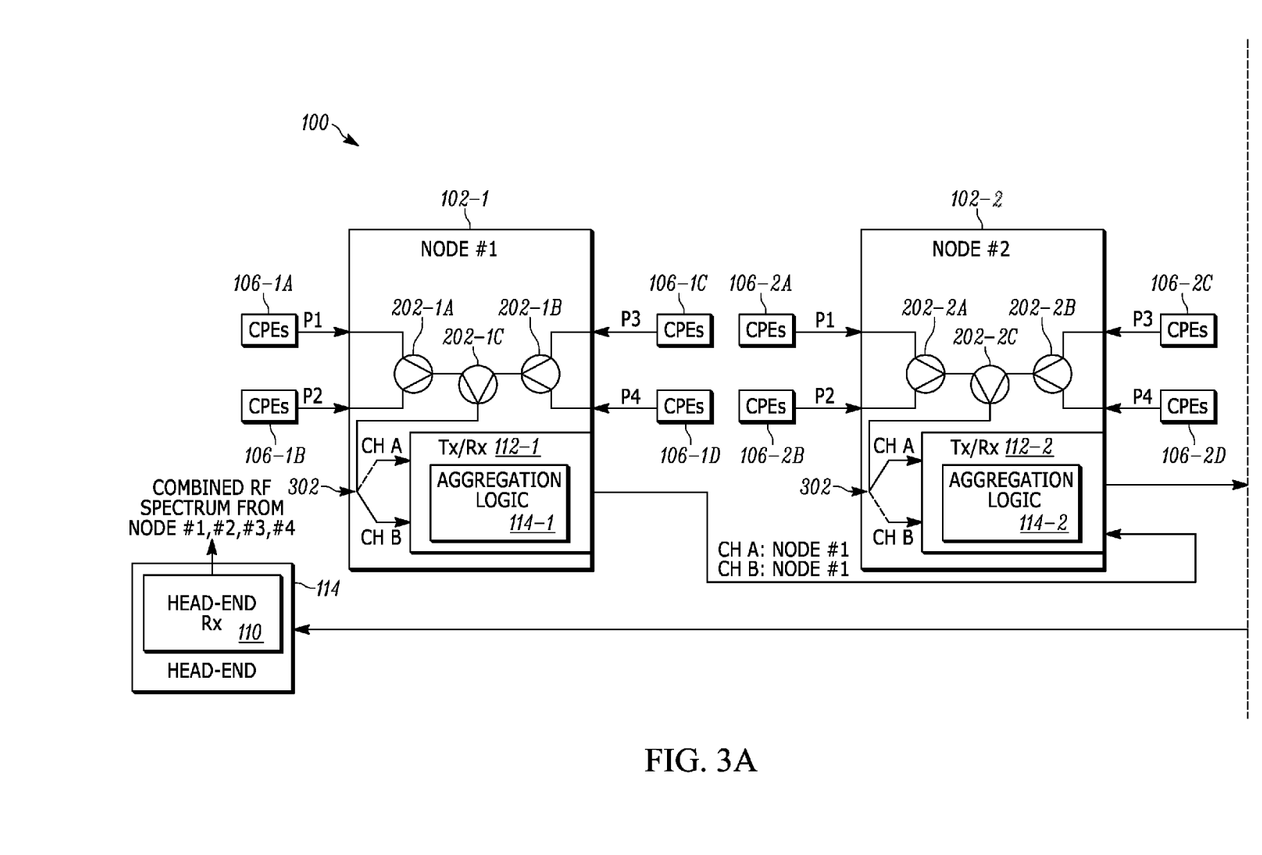
FIGS. 3A and 3B depict an example of the system for detecting which channel is active according to one embodiment.
Figure 3B:
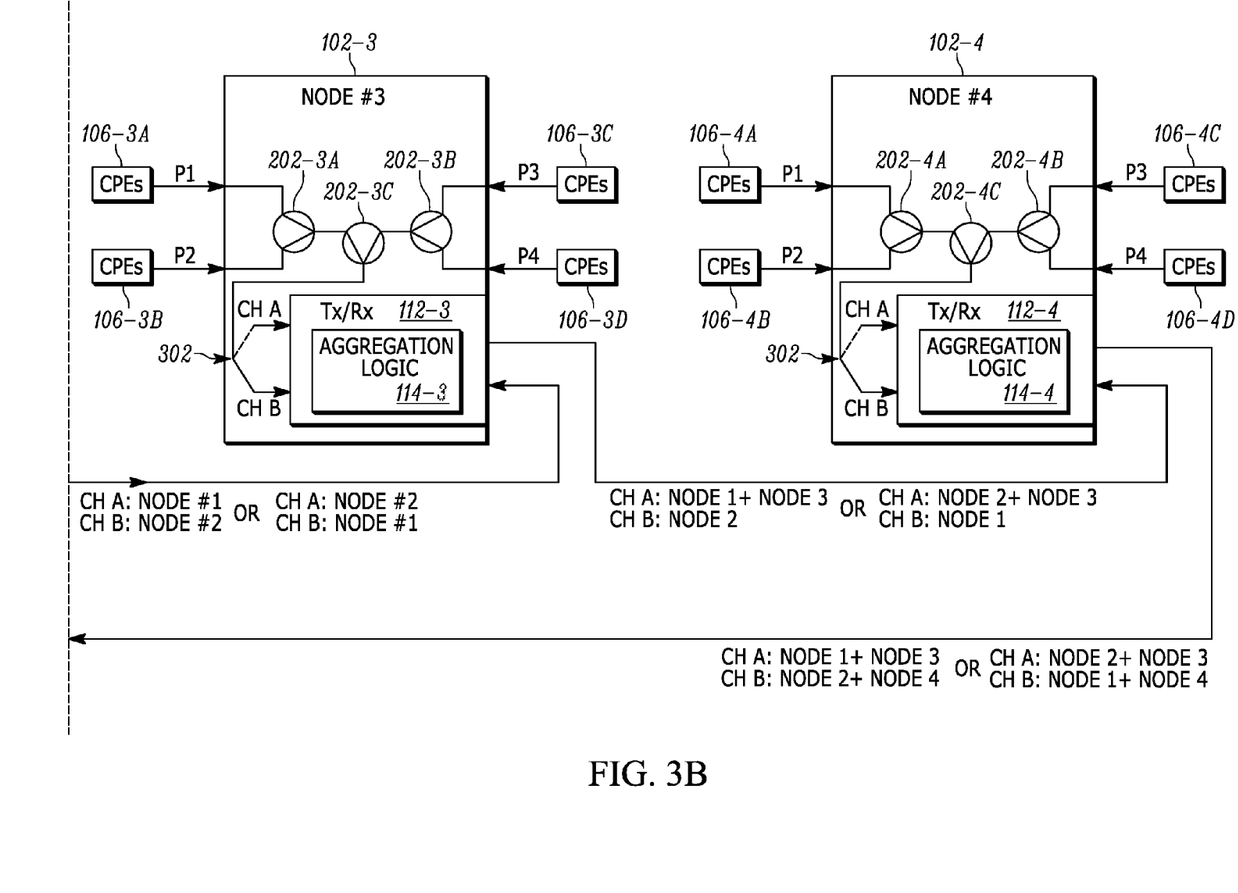

Although using channel A as the RF input was described above, it is possible where either channel A or channel B can be used for service group aggregation. Aggregation logic 114 may include an RF auto-sensing mechanism that detects which channel is active in the service group aggregation for each specific node and can use that channel. FIGS. 3A and 3B depict an example of system 100 for detecting which channel is active according to one embodiment. As shown at 302 in each node, aggregation logic 114 may sense which channel is active in the service group aggregation.

For node #1, since this is the first node, aggregation logic 114-1 may sense that the service group aggregation is input into channel B of transmitter/receiver 112-1. In this case, the service group aggregation signal is input into channel B and aggregation logic 114-1 disables the RF input at channel A. Transmitter/receiver 112-1 sends the node #1 signal on both channels A and B as described above because this is the first node. That is, the first node always sends the service group aggregation signal on both channels A and B.

In node #2, aggregation logic 114-2 senses that the service group aggregation signal for node #2 is input into channel A of transmitter/receiver 112-2. In this case, aggregation logic 114-2 disables the RF input at channel B. The output of transmitter/receiver 112-2 of node #2 may either output either the node #1 optical return signal on channel A and the node #2 optical return signal on channel B or the node #2 optical return signal on channel A and the node #1 optical return signal on channel B.

At node #3, aggregation logic 114-3 may sense that the service aggregation for node #3 is into channel B of transmitter/receiver 112-3. In this case, aggregation logic 114-3 disables the RF input at channel A. The output of transmitter/receiver 112-3 may be in one case the node #1 optical return signal and the node #3 optical return signal on channel A and the node #2 signal on channel B. In another case, the node #2 optical return signal and node #3 optical return signal are output on channel A and the node #1 optical return signal is output on channel B.

In node #4, aggregation logic 114-4 senses that channel B is active for the service aggregation input into transmitter/receiver 112-4. In this case, aggregation logic 114-4 disables the RF input at channel A. Transmitter/receiver 112-4 may output the node #1 optical return signal and the node #3 optical return signal in channel A and the node #2 optical return signal and the node #4 optical return signal on channel B. Alternatively, transmitter/receiver 112-4 may output the node #2 optical return signal and the node #3 optical return signal on channel A, and the node #1 optical return signal and the node #4 optical return signal on channel B.

Head-end receiver 110 receives the optical return signals on channel A and channel B and can process the optical return signals in the same way as described above in FIG. 2.

In some examples, it may be desirable to perform service group aggregation on all channels. Particular embodiments may accommodate this mode of operation even though the noise level is not minimized. In this case, aggregation logic 114 may be configured to allow nodes 102 to operate in this mode.

Figure 4A:
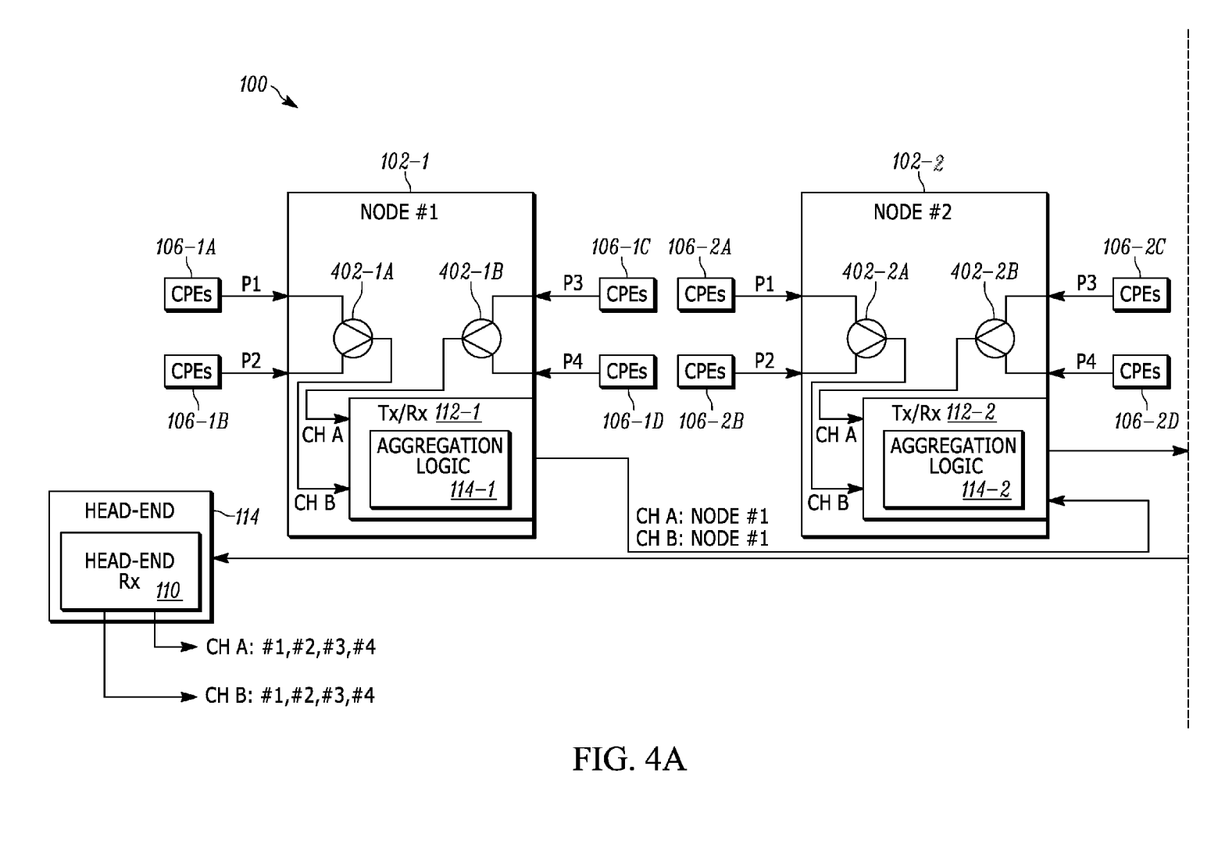
FIGS. 4A and 4B depict an example of the system showing the service group aggregation for both channels according to one embodiment.
Figure 4B:
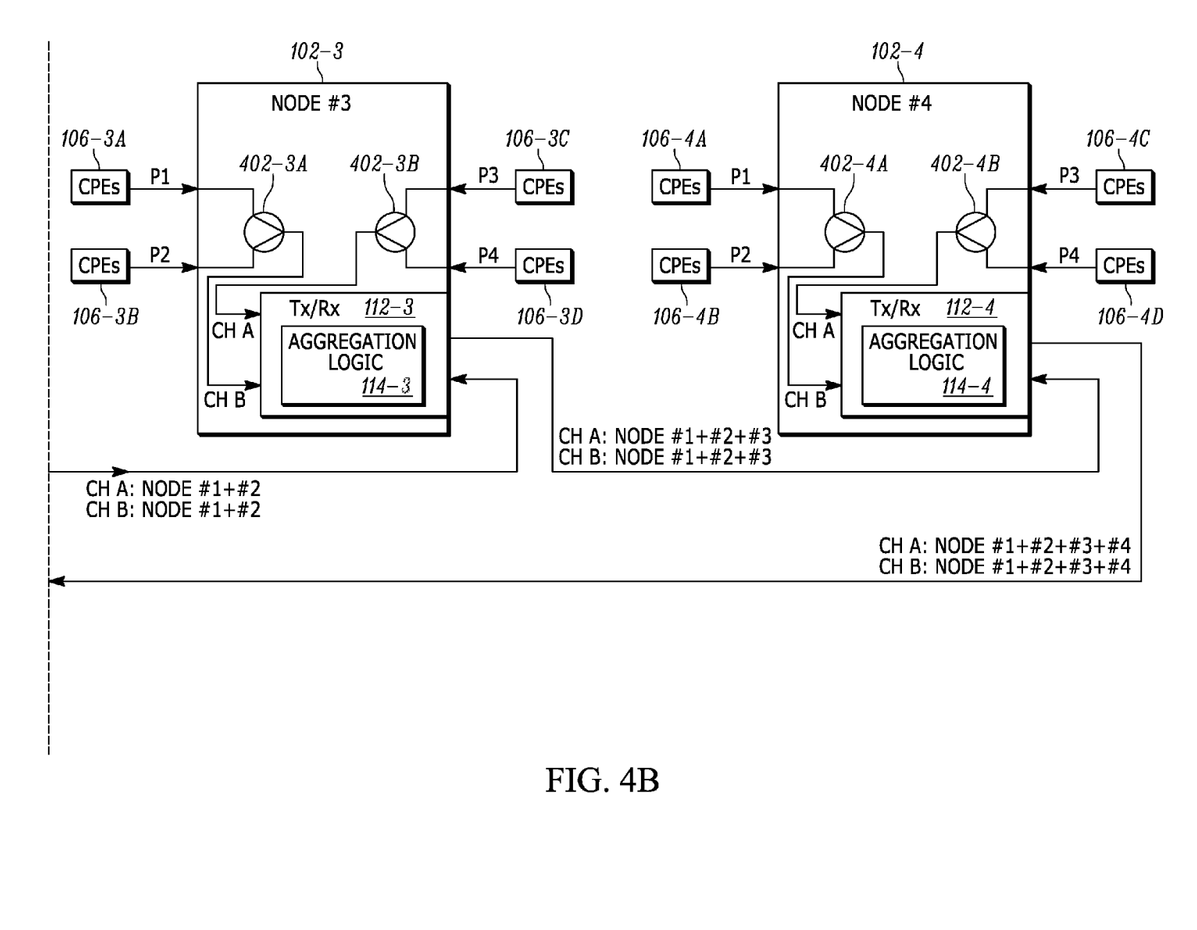

FIGS. 4A and 4B depict an example of system 100 showing the service group aggregation for both channels according to one embodiment. In this case, aggregation logic 114 may determine that the mode is set to perform service group aggregation for both channels. Also, the channel auto-sensing mechanism of aggregation logic 114 may sense that both channels are active.

As shown in each node in FIGS. 4A and 4B, CPEs 106-xA-106xB (where "x" is 1, 2, 3, or 4) are coupled to ports P1 and P2, which are coupled to channel B through a combiner 402-1A, 402-2A, 402-3A and 402-4A, respectively for each of x=1, 2, 3 or 4. Also, as shown in each node in FIGS. 4A and 4B, CPEs 106-xC-106xD (where "x" is 1, 2, 3, or 4) are coupled to ports P3 and P4, which are coupled to channel A though a combiner 402-1B, 402-2B, 402-3B, 402-4B, respectively for each of x=1, 2, 3, or 4. Transmitter/receiver 112 may send the signal for the node on both channels. That is, node #1 sends a channel A node #1 optical return signal on channel A and a channel B node #1 optical return signal on channel B. In one embodiment, the channel A node #1 optical return signal includes aggregated signals from CPEs 106-1A-1061B, and the channel B node #1 optical return signal includes aggregated signals from CPEs 106-1C-1061D. However, both optical return signals on channel A and B may include an aggregated signal for all CPEs 106-1A-106-1D.

At node #2, the node #1 channel A and channel B signals are aggregated with the node #2 service group aggregation signals. Node #2 has the same connections from ports P1-P4 as described above with respect to node #1. The output of transmitter/receiver 112-2 is the node #1 and node #2 channel A optical return signals on channel A and the node #1 and node #2 channel B optical return signals on channel B.

The above process continues in each node as each respective channel is aggregated on each node. After node #4, channel A includes the node #1, #2, #3, and #4 channel A optical return signals and channel B includes node #1, #2, #3, and #4 channel B optical return signals.

Head-end receiver 110 receives both optical return signals on channel A and channel B and can convert the optical return signals into electrical signals for channel A and channel B. In this case, head-end receiver 110 outputs two separate electrical signals, one for channel A and one for channel B.

Figure 5:
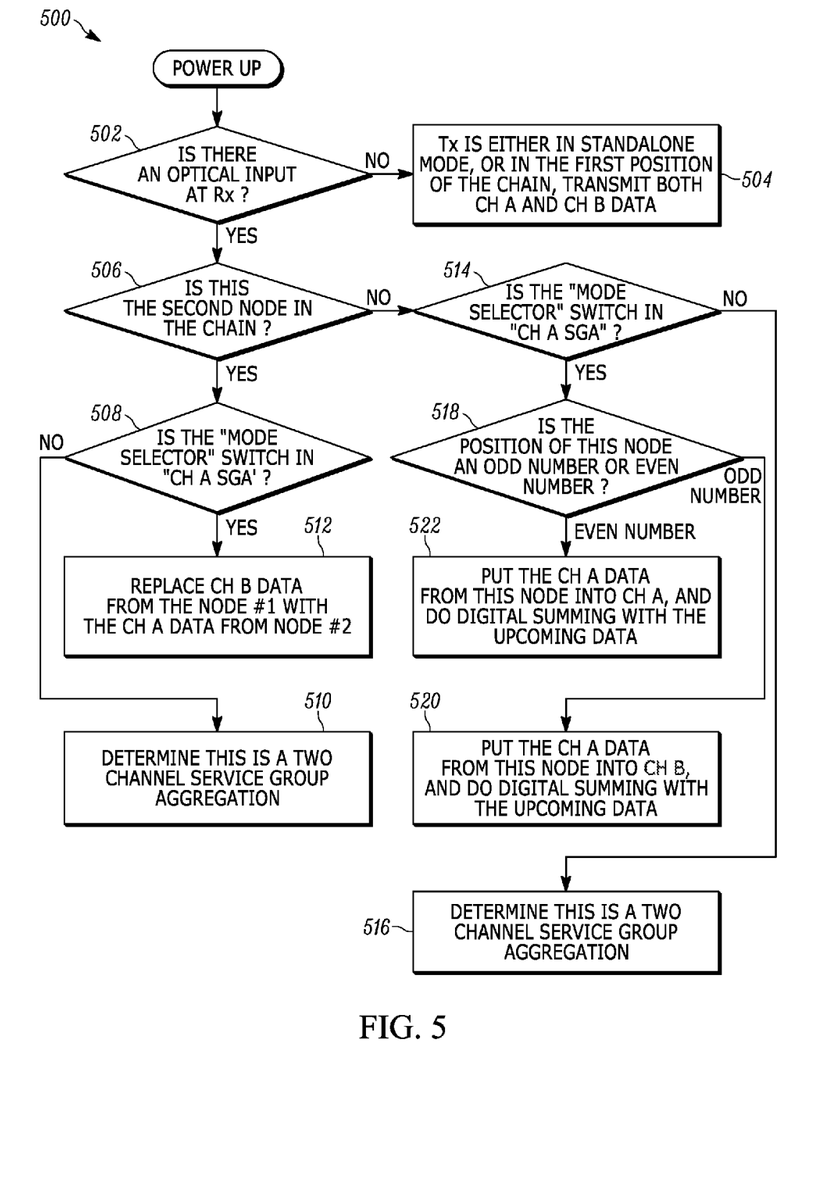
FIG. 5 depicts a simplified flowchart of a method for determining which mode is implemented and subsequently processing the signals from CPEs for the mode according to one embodiment.

With the different modes discussed above, aggregation logic 114 can evaluate and determine which mode to operate a node 102 in and perform different actions based on that determination. FIG. 5 depicts a simplified flowchart 500 of a method for determining which mode is implemented and subsequently processing the signals from CPEs 106 for the mode according to one embodiment. At 502, after power up, aggregation logic 114 determines whether there is an optical input at transmitter/receiver 112. If not, at 504, aggregation logic 114 determines that the transmitter is either in stand-alone mode or is in the first position of the daisy chain. In this case, transmitter/receiver 112 transmits the signal on both channel A and channel B.

If there is an optical input, at 506, aggregation logic 114 determines if this is a second node in the daisy chain. Different ways of determining whether this is a second node in the daisy chain may be used. For example, a "node-position" value is transported using the fiber overhead from each node in the chain, and the receiving node detects this value to determine its position in the chain. The receiving node then increments the value by 1 and sends the new value to the next node in the chain. For the first node in the chain, which will not have an active optical input, this node sends an initial value of 0 upstream for this "node-position".

If this is the second node in the daisy chain, at 508, aggregation logic 114 determines if a mode selector switch indicates that it is for channel A service group aggregation (SGA). This means that the service group aggregation should be aggregated on channel A, and not channel B. If not, then at 510, aggregation logic 114 determines this is a two-channel service group aggregation (as described in FIG. 4) and sends the service group aggregation signal on both channel A and channel B.

If the mode selector switch is on channel A SGA, then, at 512, aggregation logic 114 replaces the channel B signal from the node #1 with the channel A signal received from the service group aggregation at node #2. In this case, channel A includes the node #1 optical return signal sent on channel A, and channel B includes the node #2 optical return signal (as discussed in FIG. 2).

If this is not the second node in the daisy chain, at 514, aggregation logic 114 determines if the mode selector switch is in the channel A SGA mode. If not, at 516, channel A and channel B are both used to send the service group aggregation signal.

If aggregation logic 114 determines the mode selector switch is in the channel A SGA mode, at 518, aggregation logic 114 determines if this position of the node is an odd number or even number. The odd number or even number will dictate on which channel to aggregate the service group aggregation signal for the respective node. At 520, if this node is an odd number, then aggregation logic 114 puts the channel A signal for this node onto the channel A output and does a digital summing with the channel A incoming optical return signal from the previous node. If this node is an even number, at 522, aggregation logic 114 puts the channel A signal from this node on to channel B, and does a digital summing with the incoming optical return signal on channel B.

Figure 6:
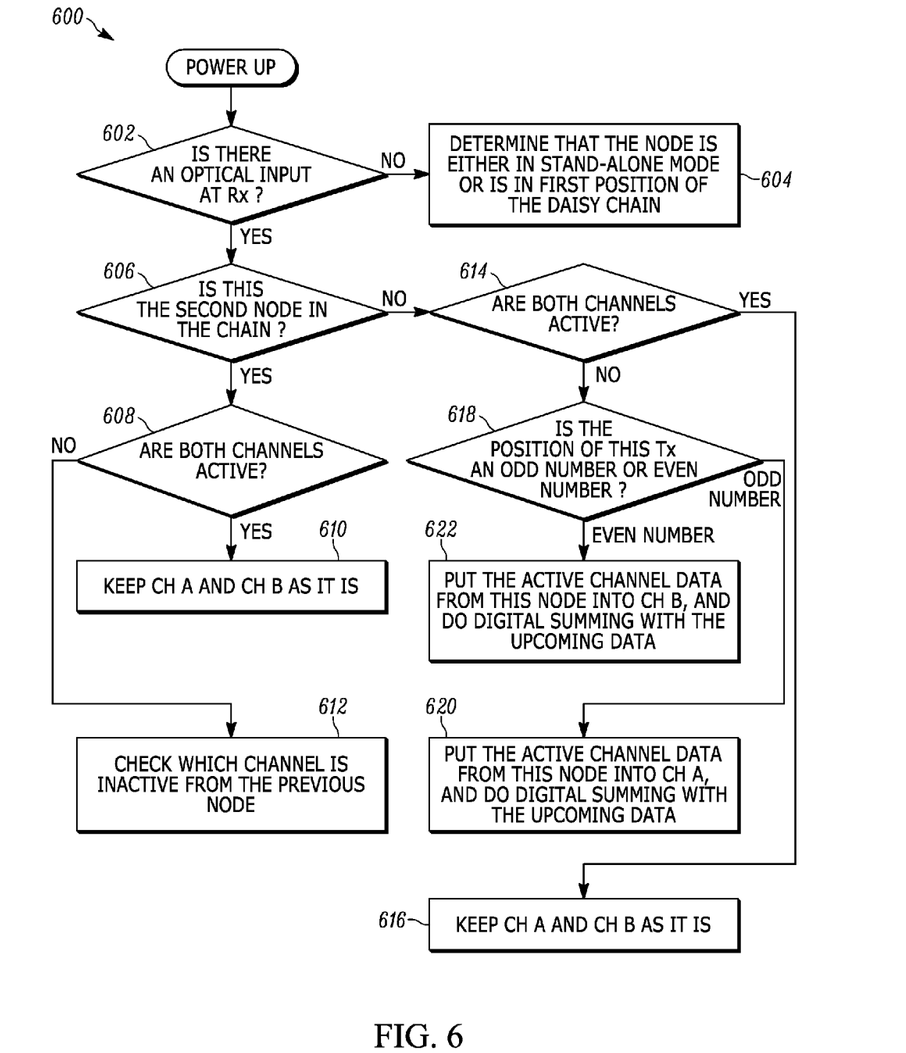
FIG. 6 depicts a simplified flowchart for performing auto-sensing according to one embodiment.

Also, aggregation logic 114 may perform auto-sensing to determine which input channels are being used for service group aggregation. FIG. 6 depicts a simplified flowchart 600 for performing auto-sensing according to one embodiment. At 602, after power up, aggregation logic 114 determines if there is an optical return signal from another node at an optical input at transmitter/receiver 112. If not, at 604, aggregation logic 114 determines that the node is either in stand-alone mode or is in the first position of the daisy chain. Transmitter/receiver 112 transmits on both channel A and channel B in this case. Also, aggregation logic 114 monitors if both channel A and channel B are active or not. If one of the channels is not active, aggregation logic 114 sends the optical return signal upstream on the active channel. Aggregation logic 114 may also disable one of these channels if it senses a channel is not active.

If there is an optical return signal received at an optical input, at 606, aggregation logic 114 determines if this node is the second node in the daisy chain. If so, at 608, aggregation logic 114 determines if both RF input channels are active. If both channels are active, at 610, aggregation logic 114 determines the node is in the two-channel service group aggregation mode and keeps channel A and channel B as they are.

At 612, if both RF input channels are not active, aggregation logic 114 checks which channel is inactive from the previous node. If the previous node had channel A active, then aggregation logic 114 puts the active channel for the second node on channel B. If the first node had channel B active, then aggregation logic 114 puts the active channel for the second node on to channel A. In the first case, transmitter/receiver 112 may transmit the service group aggregation signal on channel B and in the second case, transmitter/receiver 112 may transmit the service group aggregation signal on channel A.

If this node was not the second node in the daisy chain, at 614, aggregation logic 114 determines if both RF input channels are active. If so, at 616, aggregation logic 114 keeps channel A and channel B as they are.

At 618, if both channels are not active, aggregation logic 114 determines if the position of this node is an odd number or even number. If this node is an odd number, then aggregation logic 114, at 620, puts the service group aggregation signal from this node onto channel A and does digital summing with the incoming signal from channel A. If this node is an even number, at 622, aggregation logic 114 puts the service group aggregation signal for this node onto channel B, and does digital summing with the incoming signal on channel B.

Figure 7:
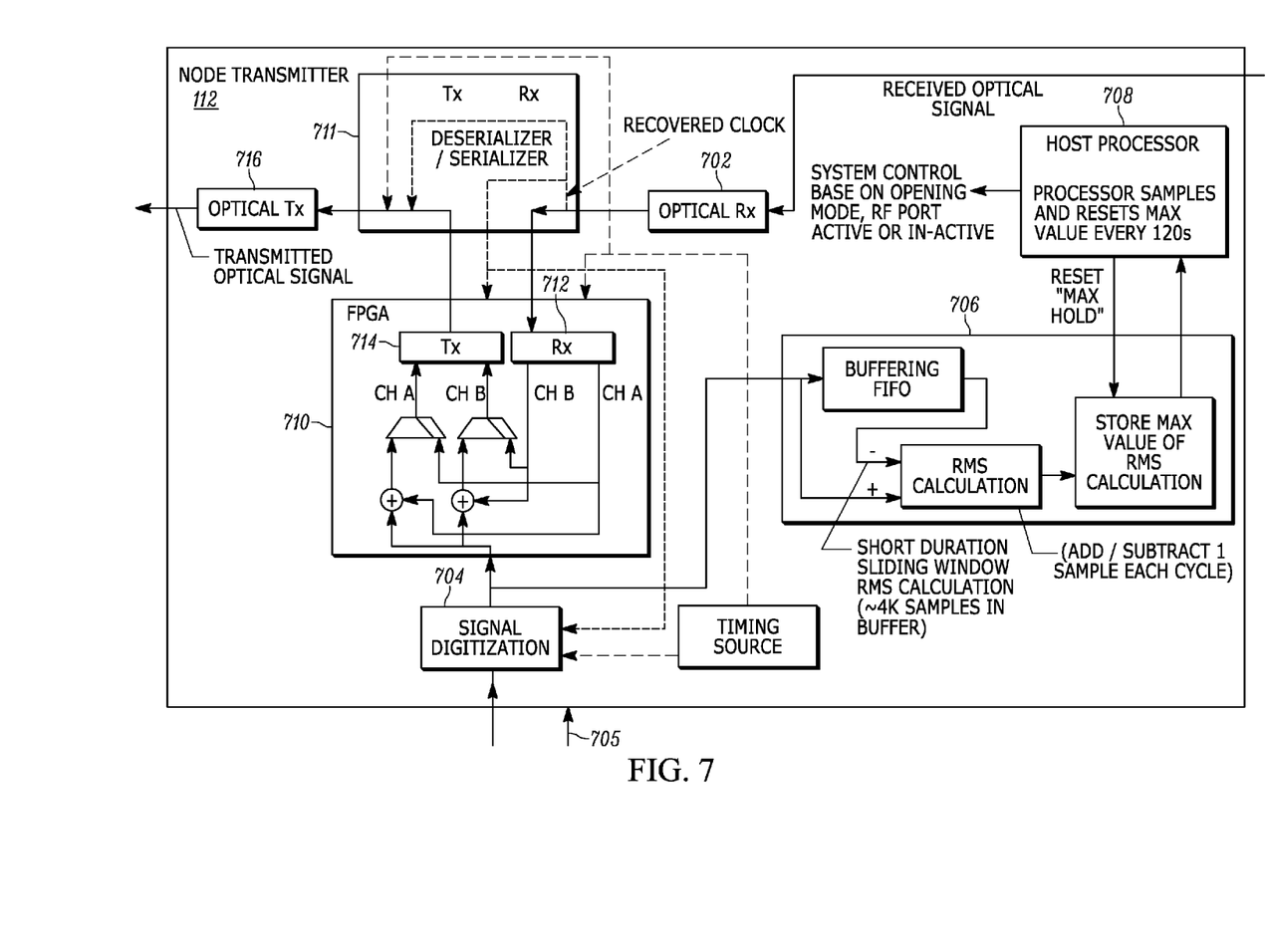
FIG. 7 depicts a more detailed example of transmitter/receiver and the aggregation logic according to one embodiment.

FIG. 7 depicts a more detailed example of transmitter/receiver 112 and aggregation logic 114 according to one embodiment. Transmitter/receiver 112 receives an optical signal from another node at an optical receiver 702. Also, a service aggregation signal from ports of node 102 is received at a signal digitization block 704. Transmitter/receiver 112 also includes another input at 705 that is disabled.

A logic block 706 may determine information that is used to determine which ports are active in node 102 and also the operating mode of node 102. For each RF input, logic block 706 may be duplicated and performs the same functions. The logic block for the RF input at 705 is not shown. In one embodiment, logic block 706 performs an RMS calculation and outputs values from the RMS calculation for analysis by host processor 708. Host processor 708 may use the RMS calculations to determine which channel is being used for service group aggregation and also what mode the node is operating in. For example, host processor 708 may determine whether or not signals from CPEs 106 are being received on a port based on the RMS values. In this measurement scheme, the RMS calculation is performed in the digital domain, after A/D conversion. A sliding window RMS calculation is performed to determine if signal energy is present. In one embodiment, due to the speed at which data samples exit the A/D converter in the system, any RMS signal measurement needs to be implemented in real-time hardware in order utilize and process all received signals in the calculation at wire speed. A supervisory host processor 708 can process intermediate results at a much slower rate as described below. In one embodiment, signal samples exit the A/D converter at a rate of approximately 186 Msps.

A sliding window RMS calculation requires a summation of many squared values occurring during this time window. At each time sample, the oldest value is no longer factored into the calculation, and the newest value is included in the calculation. One way to accomplish this is to include a buffer memory (FIFO) along with an RMS calculator that includes an accumulator that can perform this addition and subtraction after each signal sample is received. The signal values over the time window are stored. The example implementation includes a 4 k sample buffer, allowing for the RMS calculation to be performed over a 22 us sliding window. This window can be extended by adding buffer memory is necessary. Alternatively, a subsampling approach can be implemented where only 1 out of every N input samples are included in the RMS calculation (not described here). Logic block 706 continues to monitor this RMS calculation over a 120 s time period and compare the current RMS value to the maximum RMS value received over this 120 s period. If the current value is larger than this stored "max value", then the current value becomes the new "max value" (a "max hold" function). This "max value" comparison also occurs at the A/D sample rate of 186 MHz. At the beginning of the 120 s period, the max. value is reset to 0 by a host microprocessor 708, and at the end of the period, the max. value is read by the host processor and compared to a settable threshold to determine whether there is RF activity on the incoming RF port. This scheme can detect burst transmissions as are seen in DOCSIS upstream and other HFC upstream signaling formats.

To determine the mode, host processor 708 may determine if both channels are active or not. Host processor 708 outputs a system control signal based on the analysis indicating whether a channel is active or channels are active.

Logic 710 may be a field programmable gate array or similar circuit logic. Logic 710 receives the RF signal from signal digitization block 704 and also the optical return signal from optical receiver 702, which is de-serialized in logic 711 and then received by receiver 712 in logic 710. Logic 710 may combine the signals onto channel A and channel B as described above based on the system control signal from host processor 708. Various combiner, multiplexers, and other logic may be used to determine which signals to place on which channels of transmitter 714. Then, transmitter 714 sends the signals to an optical transmitter 716, which may transmit the optical signals on channels A and B.

Figure 8A:
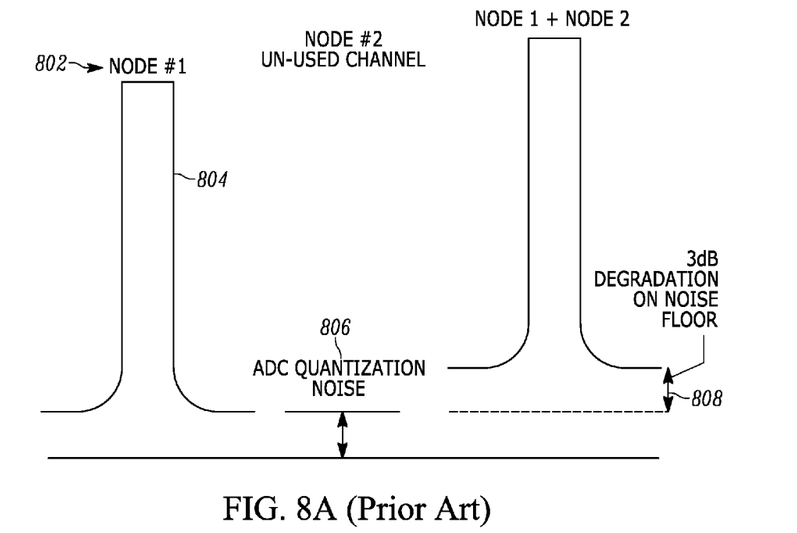
FIGS. 8A and 8B show the improved noise performance according to one embodiment.
Figure 8B:
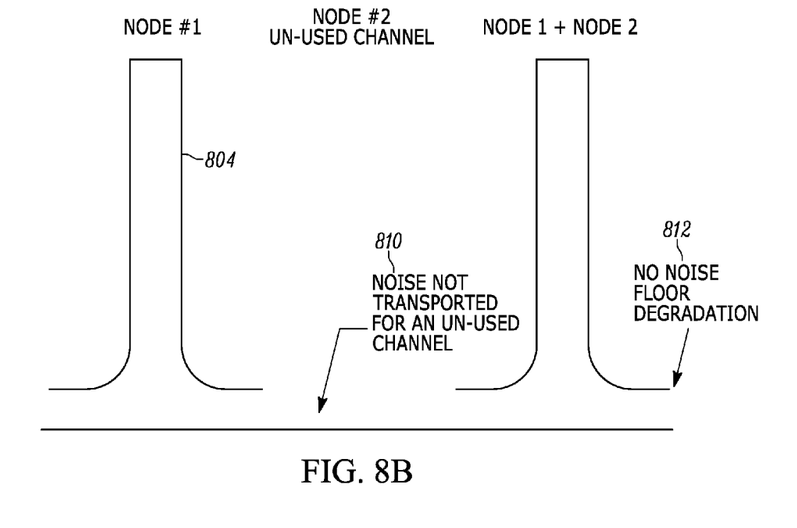

As mentioned above, particular embodiments reduce the noise in the transmission of signals. FIGS. 8A and 8B show the improved noise performance according to one embodiment. FIG. 8A shows a prior art graph of noise that is added to the signal. At 802, node #1 includes a signal 804 representing the service group aggregation signal that is received at node #2. At node #2, an unused channel, such as channel B, may introduce analog-to-digital converter (ADC) quantization noise as shown at 806. At 808, when node #2 transmits the node #1 and node #2 signal, there is a 3 dB degradation on the noise floor shown at 808.

In FIG. 8B, node #2 receives the signal from node #1 at 804. However, at 810, noise is not transported for an unused channel because node #2 disables that unused channel input. At 812, when node #2 transports the node #1 signal and the node #2 signal, there is no noise floor degradation for that signal.

Accordingly, particular embodiments provide aggregation logic 114 that can perform an automatic disabling of a return transmitter input when an input signal is not present from service aggregation of CPE signals. This minimizes noise aggregation and improves the signal-to-noise ratio at the head-end digital return receiver 110 output. Also, in the case of a single node in the upstream direction for a service group, aggregation logic 114 always connects the service aggregation signal to the node's digital return transmitter channel A input (or channel B). However, aggregation logic 114 may auto-assign the service aggregation signal to either channel A or channel B, or auto-balance in an alternating way the service aggregation signal to channel A or channel B. Further, aggregation logic 114 includes an auto-sensing mode that allows a configuration of either connecting the return transmitter service aggregation signal input to channel A or channel B, but because of the auto-detection or auto-sensing, aggregation logic 114 can still auto-assign and auto-balance the signals. Although particular embodiments may use TDM transport with more than two streams, such as with four TDM streams in channels A, B, C, and D, where alternate assignment would take place over the full four TDM streams/channels.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, at a node in a daisy chain of nodes in a communication network, a first aggregated signal from signals received from customer premise equipment in a first service group serviced by the node;
   connecting, by the node, the first aggregated signal to a first radio frequency (RF) input of a return transmitter/receiver and disabling at least one other RF input of the return transmitter/receiver;
   converting the first aggregated signal in to a first optical return signal;
   determining, by the node, whether a second optical return signal representing aggregated signals from signals received from customer premises equipment in a second service group serviced by another node is received from the another node in the daisy chain; and
   when the second optical return signal is received from another node, assigning the first optical return signal associated with the first aggregated signal from the customer premise equipment in the first service group to at least one of a plurality of distinct channels and assigning the second optical return signal received from another node to at least one of (a) a second one of the plurality of distinct channels at the node or (b) alternating assignment of optical return signals between at least two channels in the plurality of distinct channels.

2. The method of claim 1, wherein when the node is a first node in the daisy chain of nodes and does not receive the second optical return signal, sending the first optical return signal on at least two channels to a second node in the daisy chain of nodes.

3. The method of claim 1, wherein when the node is a second node in the daisy chain of nodes, the method further comprising:
   receiving the second optical return signal on the at least two channels; and
   replacing one of the second optical return signals on one of the at least two channels with the first optical return signal including the first aggregated signal.

4. The method of claim 1, wherein when the node is a third node or greater in the daisy chain of nodes, the method further comprising:
   receiving the second optical return signal on the first channel and a third optical return signal on the second channel; and
   determining which of the first channel and the second channel to place the first optical return signal based on a position of the third node in the daisy chain.

5. The method of claim 1, wherein determining when only the first input of the return transmitter/receiver is coupled to receive the first aggregated signal comprises:
   auto-sensing which inputs are active to receive signals from customer premise equipment at the transmitter/receiver.

6. The method of claim 1, wherein determining when the second optical return signal is received from another node in the daisy chain comprises receiving the second optical return signal at an optical input different from the first input.

7. The method of claim 1, wherein the node includes the first input and a second input that are able to receive signals from customer premise equipment serviced by the node, the method further comprising:
   sensing which of the first input or the second input is active coupled to receive the second aggregated signal.

8. The method of claim 1, wherein:
   the first input receives a radio frequency signal from the customer premise equipment as the first aggregated signal, and
   the second optical return signal is received at an optical input of the transmitter/receiver.

9. The method of claim 3, wherein the first optical return signal is sent on the first channel and the optical return signal is sent on the second channel.

10. The method of claim 4, wherein determining which of the first channel and the second channel comprises placing the first optical return signal on whichever of the first channel and the second channel has seen fewer aggregations of optical return signals.

11. The method of claim 5, wherein when auto-sensing determines that multiple inputs are active, sending signals from the customer premise equipment from the multiple inputs in different optical return signals.

12. The method of claim 10, further comprising sending optical return signals on the first channel and the second channel to a head-end receiver.

* * * * *